United States Patent
Horii et al.

(10) Patent No.: US 12,280,759 B2
(45) Date of Patent: Apr. 22, 2025

(54) VEHICLE BRAKE SYSTEM

(71) Applicant: HONDA MOTOR CO., LTD., Tokyo (JP)

(72) Inventors: Eisuke Horii, Tokyo (JP); Hiroyuki Iwasaki, Tokyo (JP); Yohei Sato, Tokyo (JP); Tomoaki Kotaki, Tokyo (JP); Masayuki Ueno, Tokyo (JP); Shotaro Yamazaki, Tokyo (JP); Atsuki Ohira, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 18/460,836

(22) Filed: Sep. 5, 2023

(65) Prior Publication Data

US 2024/0075915 A1    Mar. 7, 2024

(30) Foreign Application Priority Data

Sep. 7, 2022    (JP) ................. 2022-141967

(51) Int. Cl.
*B60T 8/40* (2006.01)
*B60T 13/66* (2006.01)

(52) U.S. Cl.
CPC .......... *B60T 8/4081* (2013.01); *B60T 13/662* (2013.01)

(58) Field of Classification Search
CPC ...... B60T 8/4081; B60T 13/662; B60T 13/62; B60T 8/88; B60T 8/885; B60T 2270/40
See application file for complete search history.

(56) References Cited

U.S. PATENT DOCUMENTS

| | | | | |
|---|---|---|---|---|
| 10,017,168 | B2 * | 7/2018 | Aoki | B60T 8/4081 |
| 10,106,138 | B2 | 10/2018 | Aoki et al. | |
| 2014/0020377 | A1 * | 1/2014 | Ito | B60T 13/147 60/534 |
| 2019/0366997 | A1 * | 12/2019 | Jeong | B60T 13/167 |

FOREIGN PATENT DOCUMENTS

JP    2016147644 A    8/2016

* cited by examiner

*Primary Examiner* — Jacob M Amick
(74) *Attorney, Agent, or Firm* — Armstrong Teasdale LLP

(57) ABSTRACT

A vehicle brake system includes a first fluid pressure generating device for generating a fluid pressure according to a brake operating amount, a second fluid pressure generating device for generating a fluid pressure by moving a piston with an electric actuator, and a switching valve switchable between a first state allowing communication between the first fluid pressure generating device and a vehicle behavior stabilizing device and a second state allowing communication between the second fluid pressure generating device and the vehicle behavior stabilizing device. A control device places the switching valve in the second state during execution of automatic brake control, and places the switching valve in the first state when a predetermined abnormality occurs in the vehicle, except that the control device places the switching valve in the second state when an abnormality including inability of the second fluid pressure generating device to generate the fluid pressure occurs.

3 Claims, 3 Drawing Sheets

VEHICLE BRAKE SYSTEM

TECHNICAL FIELD

The present disclosure relates to a vehicle brake system.

BACKGROUND ART

In recent years, efforts have been made to provide access to sustainable transportation systems that take into account people in vulnerable situations such as the elderly, people with disabilities, and children among transportation participants. To realize this, research and development are actively conducted to further improve the safety and convenience of traffic through development of vehicle braking.

As a vehicle brake system, there is known a brake system that includes a master cylinder and a slave cylinder and has the functions of both a brake-by-wire type brake system and a hydraulic brake system (see JP2016-147644A). This brake system is provided with a switching valve for switching the connection state of the oil passages to switch the supply source of the hydraulic oil supplied to the wheel brakes between the master cylinder and the slave cylinder. A three-way valve is used as the switching valve, whereby the oil passages of the brake system are shortened and the overall size of the brake system is reduced. This brake system is further provided with a fluid pressure control unit (vehicle behavior stabilizing device) for controlling fluid pressures applied to the wheel brakes (frictional brakes) to support the stabilization of the vehicle. The vehicle behavior stabilizing device is disposed between the switching valve and the wheel brakes.

In general, during execution of automatic brake control in which the fluid pressure is supplied to the frictional brake regardless of brake operation by the driver of the vehicle, such as during cruise travel or during automatic driving, the switching valve functionally connects the slave cylinder to the vehicle behavior stabilizing device via an oil passage. On the other hand, when abnormality of the slave cylinder occurs during execution of the automatic brake control, the switching valve functionally connects the master cylinder to the vehicle behavior stabilizing device via an oil passage.

The master cylinder is disposed in a position to be connected with a brake operation member. The slave cylinder can be disposed in an appropriate position without such a restriction. In general, the orifice of the connection part of the switching valve with the master cylinder is smaller than the orifice of the connection part of the switching valve with the slave cylinder. Therefore, the braking performance when the by-wire brake system fails and the brake fluid is pressurized by the vehicle behavior stabilizing device is lowered than the braking performance when the fluid pressure is generated by the slave cylinder. Also, when the hydraulic fluid is at a low temperature, the fluidity of the hydraulic fluid is reduced compared to when the hydraulic fluid is at a high temperature. Therefore, the lowering of the braking performance when the fluid pressure is generated by the master cylinder is remarkable when the hydraulic fluid is at a low temperature.

SUMMARY OF THE INVENTION

In view of such problems of the prior art, a primary object of the present invention is to enhance the pressure boosting performance of the vehicle behavior stabilizing device when the hydraulic fluid is at a low temperature, thereby contributing to development of sustainable transportation systems.

To achieve the above object, one aspect of the present invention provides a vehicle brake system (1), comprising: a first fluid pressure generating device (15) configured to generate a fluid pressure according to a brake operating amount (PS), which is an amount of operation of a brake operation member (10) by a driver; a second fluid pressure generating device (13) configured to generate a fluid pressure by moving a piston (21a, 21b) with an electric actuator (12); a frictional brake (7) provided for each wheel (2) and actuated by the fluid pressure; a switching valve (24a, 24b) configured to switch oil passages (16) such that the frictional brake is functionally connected to one of the first fluid pressure generating device and the second fluid pressure generating device; a control device (11) configured to control the second fluid pressure generating device and the switching valve; and a vehicle behavior stabilizing device (26) provided in the oil passage between the switching valve and the frictional brake, the vehicle behavior stabilizing device being configured to adjust the fluid pressure of a hydraulic fluid supplied from the first fluid pressure generating device or the second fluid pressure generating device and to apply an adjusted fluid pressure to the frictional brake, wherein the switching valve is configured to be switchable between a first state in which the switching valve makes the first fluid pressure generating device and the vehicle behavior stabilizing device communicate with each other and prevents a flow of the hydraulic fluid from the vehicle behavior stabilizing device to the second fluid pressure generating device and a second state in which the switching valve prevents a flow of the hydraulic fluid from the vehicle behavior stabilizing device to the first fluid pressure generating device and makes the second fluid pressure generating device and the vehicle behavior stabilizing device communicate with each other, and the control device places the switching valve in the second state (ST7) during execution of automatic brake control (ST1: Yes, ST2: Yes) in which the fluid pressure is supplied to the frictional brake regardless of brake operation by the driver, and places the switching valve in the first state (ST5) when a predetermined abnormality occurs in the vehicle (ST3: Yes), except that the control device places the switching valve in the second state (ST7) when an abnormality including inability of the second fluid pressure generating device to generate the fluid pressure occurs in the vehicle during the execution of the automatic brake control (ST4: Yes).

According to this aspect, even when the second fluid pressure generating device becomes unable to generate the fluid pressure during the execution of the automatic brake control, the control device places the switching valve in the second state, whereby the second fluid pressure generating device and the vehicle behavior stabilizing device are brought into a communicating state, namely, a state functionally connected to each other via the oil passage. Therefore, the vehicle behavior stabilizing device can receive supply of the hydraulic fluid from the second fluid pressure generating device. Thus, it is possible to enhance the pressure boosting performance of the vehicle behavior stabilizing device when the hydraulic fluid is at a low temperature, while making the oil passage shorter and reducing the overall size of the brake system.

Preferably, when the abnormality including inability of the second fluid pressure generating device (13) to generate the fluid pressure occurs in the vehicle (ST4: Yes) during the execution of the automatic brake control, the vehicle behavior stabilizing device (26) increases the fluid pressure of the hydraulic fluid and applies an increased fluid pressure to the frictional brake (7) during the execution of the automatic brake control (ST11).

According to this aspect, when the second fluid pressure generating device becomes unable to generate the fluid pressure during the execution of the automatic brake control, the vehicle behavior stabilizing device receives the hydraulic fluid supplied from the second fluid pressure generating device and generates a brake force. Therefore, it is possible to enhance the pressure boosting performance of the vehicle behavior stabilizing device.

Preferably, when the abnormality including inability of the second fluid pressure generating device (13) to generate the fluid pressure occurs in the vehicle (ST4: Yes) during the execution of the automatic brake control, and there is a brake operation by the driver (ST10: Yes), the vehicle behavior stabilizing device (26) generates the fluid pressure according to the brake operating amount (PS) in the hydraulic fluid while being supplied with the hydraulic fluid from the second fluid pressure generating device (ST11).

According to this aspect, when the second fluid pressure generating device becomes unable to generate the fluid pressure during the execution of the automatic brake control, the vehicle behavior stabilizing device can generate the brake force according to the amount of brake operation by the driver. At this time also, the vehicle behavior stabilizing device generates a brake force while receiving supply of the hydraulic fluid from the second fluid pressure generating device. Therefore, it is possible to enhance the pressure boosting performance of the vehicle behavior stabilizing device even when the hydraulic fluid is at a low temperature.

Thus, according to the above arrangements, it is possible to enhance the pressure boosting performance of the vehicle behavior stabilizing device when the hydraulic fluid is at a low temperature, thereby contributing to development of sustainable transportation systems.

DETAILED DESCRIPTION OF THE INVENTION

In the following, an embodiment of the present invention will be described in detail with reference to the drawings.

Figure 1:
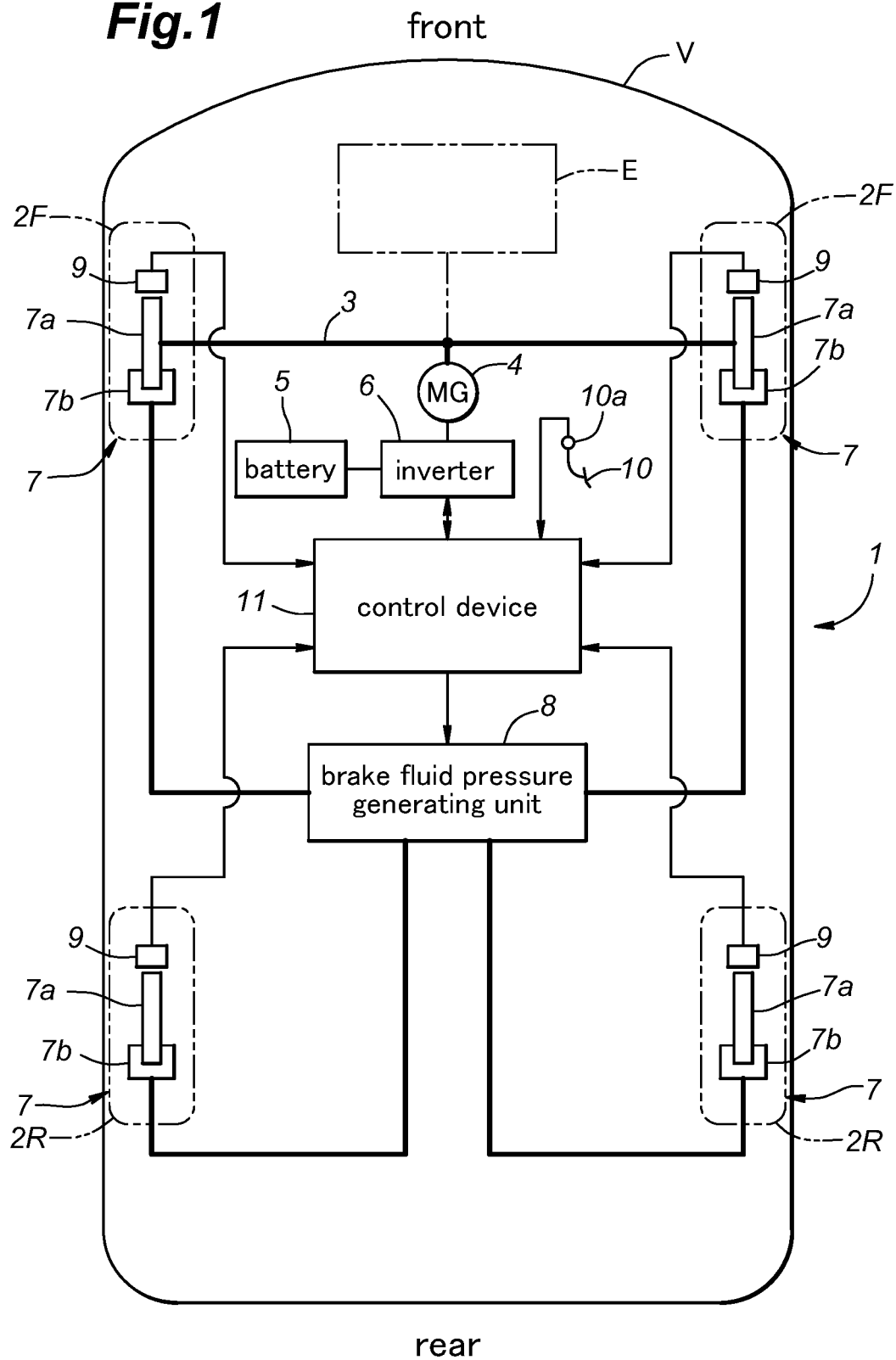
FIG. 1 is a schematic configuration diagram of a vehicle incorporated with a brake system according to an embodiment of the present invention.

FIG. 1 is a schematic configuration diagram of an electric or hybrid vehicle (hereinafter, simply referred to as the vehicle V) incorporated with a brake system 1 according to an embodiment of the present invention. The vehicle V includes a pair of left and right front wheels 2F located on the front side thereof and a pair of left and right rear wheels 2R located on the rear side thereof. The left and right front wheels 2F are connected to a front axle 3 which in turn is mechanically connected to a motor/generator 4 in a torque transmitting relationship via a differential gear device (not shown in the drawings). In the illustrated embodiment, the vehicle V consists of a front drive vehicle, but the present invention is equally applicable to a rear drive vehicle or a four wheel drive vehicle by using a motor/generator for driving the rear wheels 2R.

The motor/generator 4 operates both as an electric motor for propelling the vehicle and a generator for providing a regenerative braking. More specifically, under control of a later-described control device 11, the motor/generator 4 can receive electric power from a rechargeable battery 5 serving as a power source via an inverter 6, and can also supply electric power to the battery 5 to recharge it via the inverter 6. At the time of deceleration of the vehicle, the motor/generator 4 serves as a regenerative braking means which converts the deceleration energy into electric power by regenerative braking and generates regenerative brake force.

Each of the front and rear wheels 2F, 2R is provided with a per se known disk brake 7 which serves as a frictional brake for performing frictional braking and includes a disk 7a integrally attached to the wheel 2 (2F, 2R) and a caliper incorporated with a wheel cylinder 7b. The wheel cylinder 7b is connected to a brake fluid pressure generating unit 8 via brake tubing in a per se known manner. The brake fluid pressure generating unit 8 consists of a hydraulic circuit configured to distribute hydraulic brake fluid pressure to the different wheels and adjust the hydraulic brake fluid pressure for each wheel as will be described hereinafter.

A wheel speed sensor 9 is provided in association with each wheel 2 as a wheel speed detection means for detecting the corresponding wheel speed. The vehicle V is provided with a brake pedal 10 serving as a brake operation member used in brake operation by the driver, and the brake pedal 10 is provided with a pedal stroke sensor 10a for detecting an operation amount (depression amount) of the brake pedal 10.

The vehicle V is provided with a control device 11 which performs various controls of the vehicle and functions as a brake force control means. The control device 11 is an electronic control unit (ECU) consisting of a computer provided with a computational processing device (a processor such as a CPU, an MPU, etc.) and a storage device (a memory such as a ROM, a RAM, etc.) and configured to execute various processes. Here, that the control device 11 is configured to execute various processes means that the computational processing device (processor) constituting the control device 11 is programmed to read necessary data and application software from the storage device (memory) and to execute predetermined computational processing according to the software. The control device 11 may consist of one piece of hardware, or may consist of a unit including multiple pieces of hardware.

The control device 11 is electrically connected to the inverter 6, and receives detection signals from the wheel speed sensors 9 and the pedal stroke sensor 10a. In the case of an electric vehicle, the structure illustrated in FIG. 1 may be applied as it is, or, alternatively, an additional motor/generator for the rear wheels 2R may be included in the vehicle V. In the case of a hybrid vehicle, the front axle 3 is additionally connected to the output shaft of an engine E (internal combustion engine) indicated by an imaginary line box in FIG. 1.

When an output signal of the pedal stroke sensor 10a of the brake pedal 10 increases from an initial value (=0), the control device 11 determines that a command for braking is generated, and performs control of the brake fluid pressure generating unit 8 for braking. As described above, a regenerative cooperative control combining a regenerative braking and a hydraulic braking is performed, and thus, the brake system 1 is configured as a brake-by-wire system.

The brake system 1 of this vehicle V is described in the following with reference to FIG. 2. The brake system 1 constitutes a so-called brake-by-wire system which can control the brake force independently from the driver's operation. Namely, the brake system 1 does not use the fluid pressure generated by a master cylinder 15 (first fluid pressure generating device), to which the operation of the brake pedal 10 is mechanically transmitted, as the brake fluid pressure. The control device 11 detects the operation amount (brake pedal operating amount PS) of the brake pedal 10 by using the pedal stroke sensor 10a, and switches oil passages 16 (16c, 16d) based on the detected value of the brake pedal operating amount PS. Also, the control device 11 actuates an electric servo motor 12 (electric actuator) based on the fluid pressure generated by the master cylinder 15, and thereby controls operation of a motor actuated cylinder (slave cylinder) 13 (second fluid pressure generating device) to make it generate a brake fluid pressure.

The brake pedal 10 is pivotally supported by the vehicle body and undergoes an angular movement according to the braking operation by the driver. One end of a rod 14 for converting the angular movement of the brake pedal 10 into a substantially linear motion is connected to the brake pedal 10, and the other end of the rod 14 engages a first piston 15a of the master cylinder 15 of a tandem type to force the first piston 15a into the master cylinder 15 according to the braking operation by the driver. The master cylinder 15 additionally receives therein a second piston 15b on the side of the first piston 15a away from the rod 14 in line with the first piston 15a, and the first and second pistons 15a and 15b are both spring-urged toward the rod 14. The brake pedal 10 is spring-urged and is held at the initial position shown in FIG. 2 by a stopper not shown in the drawings when the brake pedal 10 is not being operated.

The brake system 1 is provided with a reservoir tank 20 connected to the motor actuated cylinder 13 and the master cylinder 15 via oil passages 16a, 16b, respectively, to replenish the brake fluid to them. Inside the master cylinder 15, a first fluid chamber 17a is defined between the first and second pistons 15a and 15b, and a second fluid chamber 17b is defined on the side of the second piston 15b facing away from the first piston 15a. The first and second fluid chambers 17a and 17b of the master cylinder 15 are provided with respective atmosphere opening ports 17c, 17d which are each connected to the reservoir tank 20 via the oil passage 16b. The first and second pistons 15a and 15b of the master cylinder 15 are each fitted with per se known seal members at appropriate positions thereof to seal the first and second fluid chambers 17a and 17b.

In addition to the electric servo motor 12, the motor actuated cylinder 13 is provided with a gear mechanism 18 connected to the electric servo motor 12, a screw rod 19, a first piston 21a, and a second piston 21b. The screw rod 19 is connected to the gear mechanism 18 via a ball screw mechanism for an axial movement. The first piston 21a and the second piston 21b are provided coaxially with the screw rod 19 and in series with each other. The first piston 21a and the second piston 21b are spring-urged toward the screw rod 19 by respective return springs. Note that configuration is made such that the first piston 21a is able to advance (move toward the second piston 21b) independently from the second piston 21b to a certain extent, but is able to pull the second piston 21b back to the initial position when the first piston 21a returns from the advanced position to the initial position shown in FIG. 2.

Inside the motor actuated cylinder 13, a first fluid pressure generating chamber 23a is defined between the first and second pistons 21a and 21b, and a second fluid pressure generating chamber 23b is defined on the side of the second piston 21b facing away from the first piston 21a. The first and second fluid pressure generating chambers 23a and 23b of the motor actuated cylinder 13 are provided with respective atmosphere opening ports 23c, 23d which are each connected to the reservoir tank 20 via the oil passage 16a. The first and second pistons 21a and 21b of the motor actuated cylinder 13 are each fitted with per se known seal members at appropriate positions thereof to seal the first and second fluid pressure generating chambers 23a and 23b.

The first fluid chamber 17a of the master cylinder 15 and the first fluid pressure generating chamber 23a of the motor actuated cylinder 13 are connected to the disk brakes 7 of the rear wheels 2R via a solenoid switching valve 24a which consists of a three-way valve. Also, the second fluid chamber 17b of the master cylinder 15 and the second fluid pressure generating chamber 23b of the motor actuated cylinder 13 are connected to the disk brakes 7 of the front wheels 2F via a solenoid switching valve 24b which consists of a three-way valve.

The connection parts of the switching valves 24a, 24b with oil passages 16c which are connected to the first and second fluid chambers 17a and 17b of the master cylinder 15, respectively, and the connection parts of the switching valves 24a, 24b with oil passages 16d which are connected to the first and second fluid pressure generating chambers 23a and 23b of the motor actuated cylinder 13, respectively, are provided with orifices. The orifices provided in the oil passages 16c connected to the master cylinder 15 are smaller than the orifices provided in the oil passages 16d connected to the motor actuated cylinder 13.

The switching valves 24a, 24b switch the oil passages 16c, 16d so that the corresponding disk brakes 7 are functionally connected to one of the master cylinder 15 and the motor actuated cylinder 13. Specifically, the switching valves 24a, 24b are configured to be selectively placed in a second state shown in FIG. 2 in which they make the disk brakes 7 of the corresponding wheels 2 communicate with the motor actuated cylinder 13 via the oil passages 16d and a first state in which they make the disk brakes 7 of the corresponding wheels 2 communicate with the master cylinder 15 via the oil passages 16c. Note that the switching valves 24a, 24b are each placed in the first state when not energized.

In the second state, the switching valve 24a makes the wheel cylinders 7b of the disk brakes 7 of the rear wheels 2R communicate with the first fluid pressure generating chamber 23a of the motor actuated cylinder 13, and the switching valve 24b makes the wheel cylinders 7b of the disk brakes 7 of the front wheels 2F communicate with the second fluid pressure generating chamber 23b of the motor actuated cylinder 13. In the second state, each of the switching valves 24a, 24b also functions as a check valve that permits the flow of the liquid from the corresponding one of the first fluid chamber 17a or the second fluid chamber 17b of the master cylinder 15 to the wheel cylinders 7b and prevents the opposite flow.

In the first state, the switching valve 24a makes the wheel cylinders 7b of the disk brakes 7 of the rear wheels 2R communicate with the first fluid chamber 17a of the master cylinder 15, and the switching valve 24b makes the wheel cylinders 7b of the disk brakes 7 of the front wheels 2F communicate with the second fluid chamber 17b of the master cylinder 15. In the first state, each of the switching valves 24a, 24b also functions as a check valve that permits the flow of the liquid from the corresponding one of the first fluid pressure generating chamber 23a or the second fluid pressure generating chamber 23b of the motor actuated cylinder 13 to the wheel cylinders 7b and prevents the opposite flow.

Figure 2:
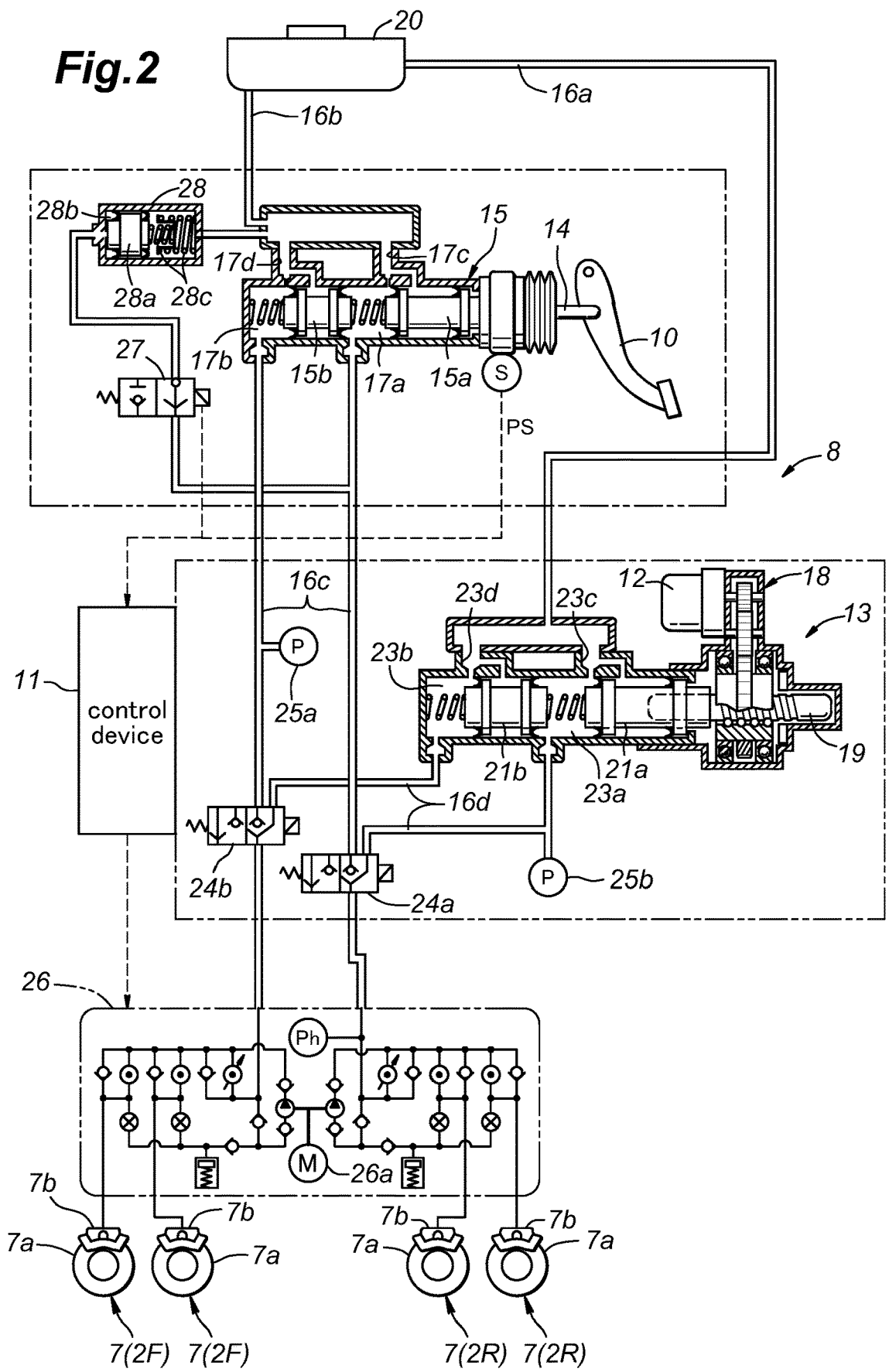
FIG. 2 is a hydraulic circuit diagram schematically showing the brake system shown in FIG. 1.

When the motor actuated cylinder 13 generates a fluid pressure while the switching valves 24a, 24b are in the second state shown in FIG. 2, the generated fluid pressure is transmitted to the wheel cylinders 7b so that the disk brakes 7 generate a brake force. When, upon operation of the brake pedal 10 by the driver, the master cylinder 15 generates a fluid pressure exceeding the fluid pressure generated by the motor actuated cylinder 13, the fluid pressure generated by the master cylinder 15 is transmitted to the wheel cylinders 7b via the switching valves 24a, 24b. As a result, the disk brakes 7 generate a larger brake force.

When the driver operates the brake pedal 10 and the master cylinder 15 generates a fluid pressure while the switching valves 24a, 24b are in the first state, the generated fluid pressure is transmitted to the wheel cylinders 7b so that the disk brakes 7 generate a brake force. When the motor actuated cylinder 13 generates a fluid pressure exceeding the fluid pressure generated by the master cylinder 15, the fluid pressure generated by the motor actuated cylinder 13 is transmitted to the wheel cylinders 7b via the switching valves 24a, 24b, so that the disk brakes 7 generate a larger brake force.

Between the second fluid chamber 17b and the switching valve 24b, a master cylinder side brake pressure sensor 25a is provided to detect the master cylinder side fluid pressure generated by the master cylinder 15. Between the switching valve 24a and the first fluid pressure generating chamber 23a, a motor actuated cylinder side brake pressure sensor 25b is provided to detect the actual brake fluid pressure generated by the motor actuated cylinder 13.

Further, the switching valves 24a, 24b are connected to a plurality (four, in the illustrated example) of wheel cylinders 7b via a VSA system 26. The VSA system 26 may consist of a per se known vehicle behavior stabilization control system configured to control an ABS for preventing the locking of the wheels at the time of braking, a TCS (traction control system) for preventing the slipping of the wheels at the time of acceleration, a yaw moment control unit when cornering, a brake assist system and an automatic brake system for collision prevention in a coordinated manner. For details of such systems, reference should be made to various prior patent publications on such subject matters. The VSA system 26 includes a first system hydraulic circuit for controlling the wheel cylinders 7b of the front wheels 2F and a second system hydraulic circuit for controlling the wheel cylinders 7b of the rear wheels 2R. The VSA system 26 includes a hydraulic motor 26a serving as a fluid pressure generating device for generating the hydraulic pressure to be supplied to each hydraulic circuit, and an operation thereof is controlled by the control device 11.

A cylinder type simulator 28 is connected to the line between the first fluid chamber 17a and the switching valve 24a via a solenoid cutoff valve 27. The simulator 28 is provided with a cylinder having an interior separated by a piston 28a. A fluid receiving chamber 28b is defined on the side of the piston 28a facing the cutoff valve 27, and a compression coil spring 28c is received on the side of the piston 28a facing away from the fluid receiving chamber 28b. The chamber in which the compression coil spring 28c is provided is in communication with the reservoir tank 20 via the master cylinder 15 and the oil passage 16b.

The cutoff valve 27 is configured to be capable of being selectively placed in a second state shown in FIG. 2 in which the cutoff valve 27 functions as a check valve and a first state in which the cutoff valve 27 cuts off the fluid receiving chamber 28b from the first fluid chamber 17a. In the second state, the cutoff valve 27 permits the flow of the liquid from the first fluid chamber 17a to the fluid receiving chamber 28b and prevents the opposite flow. Note that the cutoff valve 27 is placed in the first state when not energized.

When the driver depresses the brake pedal 10 while the switching valves 24a, 24b and the cutoff valve 27 are in the second state shown in FIG. 2, the brake fluid in the first fluid chamber 17a flows into the fluid receiving chamber 28b and the biasing force of the compression coil spring 28c is transmitted to the brake pedal 10. Thereby, the vehicle operator is caused to experience a brake pedal reaction from the brake pedal 10 in a similar manner as in the case with the conventional brake system in which the master cylinder and the wheel cylinder are directly connected to each other.

The overall control of the brake fluid pressure generating unit 8 is performed by the control device 11. The control device 11 receives various detection signals from the pedal stroke sensor 10a, the brake pressure sensors 25a, 25b and other sensors (not shown in the drawings) for detecting the behavior of the vehicle. Based on the detection signal from the pedal stroke sensor 10a and the detection signals from the various other sensors, the control device 11 controls the brake fluid pressure generated by the motor actuated cylinder 13 and hence the frictional brake force generated by each of the disk brakes 7. In the case of a hybrid vehicle (or electric vehicle) as is the case with the illustrated embodiment, as the motor/generator 4 provides a regenerative braking, the control device 11 is configured to control the brake force allocation or control the brake fluid pressure produced by the motor actuated cylinder 13 depending on the extent or magnitude of the regenerative braking.

Further, the control device 11 is configured to perform automatic driving control of level 2 or higher. Specifically, based on the input from the driver, the control device 11 executes the vehicle control in the front-rear direction (driving and braking control) and the vehicle control in the left-right direction (steering control) under specific conditions. During the execution of the automatic driving control, the control device 11 executes automatic brake control in which the fluid pressure is supplied to the disk brakes 7 regardless of the brake operation by the driver. During the execution of the automatic brake control, the control device 11 places the both switching valves 24a, 24b in the second state shown in FIG. 2 and actuates the motor actuated cylinder 13 to generate the brake force.

Incidentally, a failure that hinders the execution of the automatic driving control may occur in the vehicle V. When such an abnormality occurs during the manual driving of the vehicle V, the control device 11 terminates the brake-by-wire control using the motor actuated cylinder 13, and prohibits the automatic driving of level 2 or higher thereafter. Specifically, the control device 11 in principle places the both switching valves 24a, 24b as well as the cutoff valve 27 in the first state. On the other hand, when such an abnormality occurs during the automatic driving of the vehicle V, the control device 11 notifies the occurrence of the abnormality to the driver and requests for intervention to the driving (handover request). When the intervention to the driving by the driver is started, the control device 11 in principle places the both switching valves 24a, 24b as well as the cutoff valve 27 in the first state. With the switching valves 24a, 24b placed in the first state, the fluid pressure generated by the master cylinder 15 is directly supplied to the disk brakes 7, and the brake force according to the amount of brake operation by the driver is generated.

On the other hand, even when such an abnormality occurs, the control device 11 continues the vehicle behavior stabilization control performed by the VSA system 26, such as the aforementioned ABS, TCS, yaw moment control, brake assist function, automatic brake function, etc. Namely, the control device 11 permits part of the automatic driving including the vehicle behavior stabilization control after the occurrence of the abnormality.

Here, some of the failures that may hinder the continuation of the automatic driving result in an abnormal state in which the motor actuated cylinder 13 cannot generate a fluid pressure (fluid pressure generation-unable state). The inability of the motor actuated cylinder 13 to generate the fluid pressure may be caused by a failure of the electric servo motor 12, a failure of each brake pressure sensor 25a, 25b, etc. When a failure that leads to the inability of the motor actuated cylinder 13 to generate the fluid pressure occurs in the vehicle V, unlike the above principle the control device 11 places the both switching valves 24a, 24b in the second state while placing the cutoff valve 27 in the first state. Details of this feature will be described later.

The mode of control operation during a normal braking is described in the following. FIG. 2 shows the state of the system when the both switching valves 24a, 24b are in the second state and the cutoff valve 27 is in the second state (when the driver operates the brake pedal 10 during the manual driving or when the automatic driving control is being executed). When the driver does not operate the brake pedal 10 during the manual driving, the both switching valves 24a, 24b are in the first state and the cutoff valve 27 is in the first state. When the driver does not operate the brake pedal 10, the detection value of the pedal stroke sensor 10a is at an initial value (=0), and the control device 11 basically does not produce any brake fluid pressure generation signal.

When the brake pedal 10 is depressed to a certain extent, and the detection value of the pedal stroke sensor 10a has become greater than 0, the control device 11 performs the brake-by-wire control. Specifically, the control device 11 places the both switching valves 24a, 24b in the second state shown in FIG. 2 and prevents the fluid pressure generated by the master cylinder 15 from being transmitted to the motor actuated cylinder 13. In addition, the control device 11 places the cutoff valve 27 in the second state shown in FIG. 2 to cause the fluid pressure generated by the master cylinder 15 to be transmitted to the simulator 28. Based on the fluid pressure detected by the master cylinder side brake pressure sensor 25a, the control device 11 determines a target brake fluid pressure that takes into account the regenerative braking, and forwards a target current corresponding to the target brake fluid pressure to the electric servo motor 12. This in turn causes the screw rod 19 and hence the first piston 21a to be pushed into the cylinder according to the command value, and a brake fluid pressure corresponding to the brake pedal operating amount PS is generated in the first fluid pressure generating chamber 23a. At the same time, the second piston 21b is displaced forward under the fluid pressure in the first fluid pressure generating chamber 23a against the biasing force of the return spring, and the corresponding brake fluid pressure is generated in the second fluid pressure generating chamber 23b.

When it is detected that the vehicle operator has displaced the brake pedal 10 in the returning direction (or has released the brake pedal 10), the control device 11 controls the electric servo motor 12 to return the screw rod 19 towards the initial position according to the fluid pressure detected by the master cylinder side brake pressure sensor 25a. Thereby, the brake fluid pressure is reduced by an amount corresponding to the operation amount of the brake pedal 10. When the brake pedal 10 is fully returned to the initial position by the return spring not shown in the drawing, the control device 11 places the both switching valves 24a, 24b in the first state.

When the normal brake control is performed while the VSA system 26 is not activated, the brake fluid pressure generated by the motor actuated cylinder 13 is evenly supplied to the wheel cylinders 7b of the front and rear wheels via the VSA system 26. When the VSA system 26 is performing the brake force distributing control, the brake fluid pressure supplied to the wheel cylinder 7b of each wheel is adjusted according to the brake force distributing control.

During the execution of the automatic driving control also, the control device 11 places the both switching valves 24a, 24b and the cutoff valve 27 in the second state shown in FIG. 2 and actuates the motor actuated cylinder 13 to generate the frictional brake force necessary for the automatic driving. When the automatic driving control ends, the control device 11 places the both switching valves 24a, 24b and the cutoff valve 27 in the first state.

Figure 3:
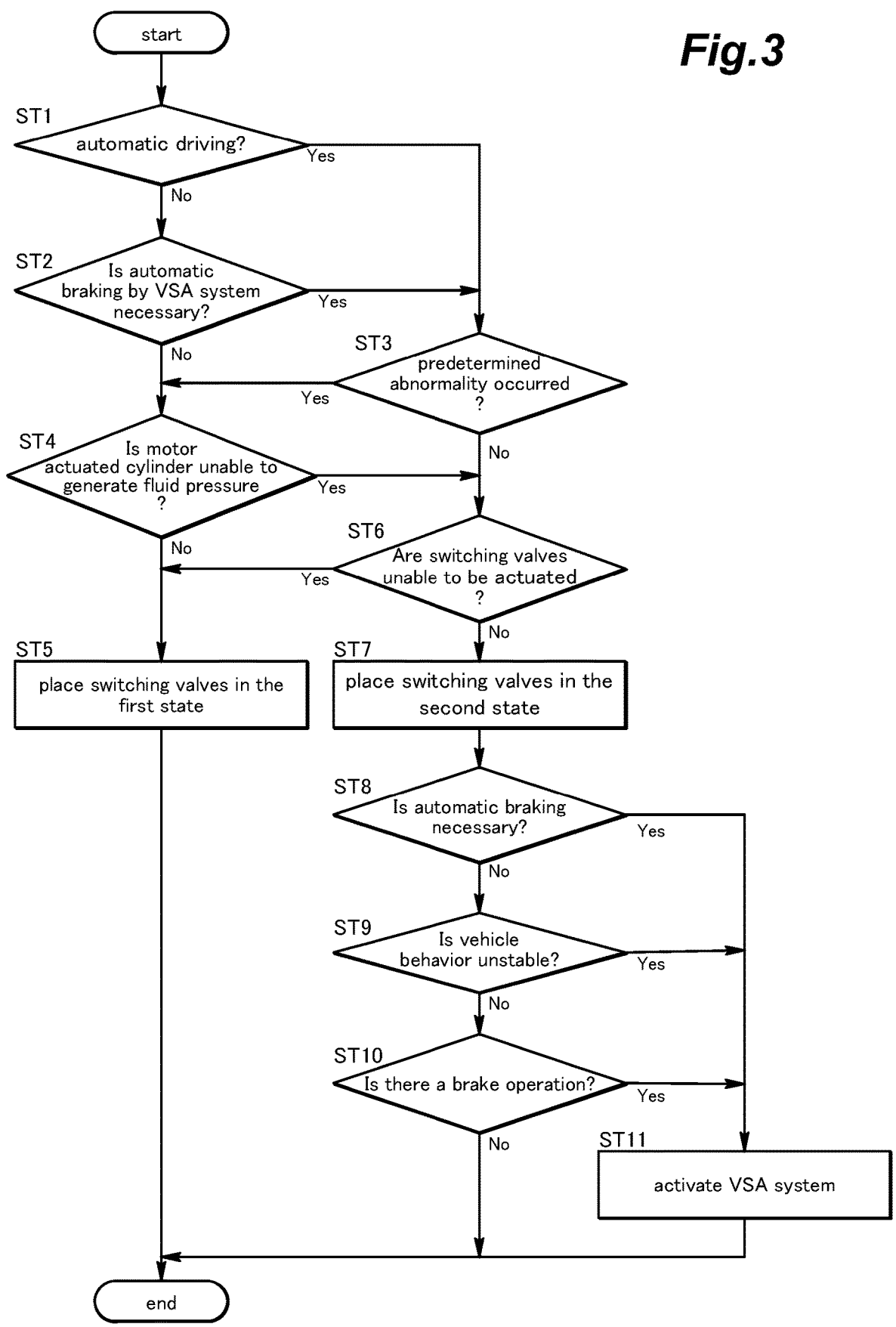
FIG. 3 is a flowchart of the braking control performed by the control device shown in FIG. 1.

Next, the mode of braking control in the event of abnormality occurrence is described in the following. FIG. 3 is a flowchart of braking control performed by the control device 11 shown in FIG. 1. The control device 11 executes the control shown in FIG. 3 repeatedly at a predetermined control interval.

The control device 11 determines whether the vehicle V is in automatic driving, namely, whether the control device 11 is executing the automatic driving control (step ST1). When the vehicle V is not in automatic driving (ST1: No), the control device 11 determines whether the automatic braking by the VSA system 26 is necessary (step ST2). When it is determined in step ST1 that the vehicle V is in automatic driving (Yes) or when it is determined in step ST2 that the automatic braking by the VSA system 26 is necessary (Yes), the control device 11 determines whether a predetermined abnormality that hinders the execution of the automatic driving control has occurred in the vehicle V (step ST3).

When it is determined in step ST3 that a predetermined abnormality has occurred in the vehicle V (Yes) or when it is determined in step ST2 that the automatic braking by the VSA system 26 is not necessary (No), the control device 11 determines whether an abnormality including inability of the motor actuated cylinder 13 to generate the fluid pressure has occurred in the vehicle V (step ST4). When an abnormality including inability of the motor actuated cylinder 13 to generate the fluid pressure has not occurred (ST4: No), the control device 11 places the both switching valves 24a, 24b in the first state (step ST5), and ends this routine. In this way, the brake system 1 is brought into a state in which the fluid pressure generated by the master cylinder 15 is directly supplied to the disk brakes 7 and the brake force according to the amount of brake operation by the driver is generated. Note that when the vehicle V is traveling by automatic driving and the both switching valves 24a, 24b are in the second state, the control device 11 may switch the both switching valves 24a, 24b to the first state after the handover to the driver is completed or after the vehicle V is stopped by minimum risk maneuver (MRM).

On the other hand, when it is determined in step ST3 that a predetermined abnormality has not occurred in the vehicle V (No) or when it is determined in step ST4 that an abnormality including inability of the motor actuated cylinder 13 to generate the fluid pressure has occurred (Yes), the control device 11 determines whether the both switching valves 24a, 24b are unable to be actuated (step ST6). When the both switching valves 24a, 24b are unable to be actuated (ST6: Yes), the control device 11 causes the process to proceed to step ST5. In this case, the both switching valves 24a, 24b are in the first state because they are unable to be actuated or in a de-energized state. Therefore, if the power supply is connected to the switching valves 24a, 24b to place them in the second state (such as when the vehicle V is in automatic driving), the control device 11 disconnects the power supply in step ST5. On the other hand, when the vehicle V is in manual driving and hence the switching valves 24a, 24b are in the first state, the control device 11 does not perform any processing in step ST5.

When it is determined in step ST6 that the both switching valves 24a, 24b are not unable to be actuated (No), the control device 11 places the both switching valves 24a, 24b in the second state shown in FIG. 2 (step ST7). Thereby, the fluid pressure generated by the motor actuated cylinder 13 is supplied to the disk brakes 7, and it becomes possible for the control device 11 to generate a desired brake force.

After step ST7, the control device 11 determines whether the automatic braking (brake force) by the automatic driving control is necessary (step ST8). For example, when a predetermined abnormality occurs during the automatic driving and a handover request is made to the driver but no response is received, it is determined that automatic braking is necessary for degeneration control or MRM (minimum risk maneuver). When automatic braking is not necessary (ST8: No), the control device 11 determines whether the vehicle behavior is unstable, namely, whether an unstable state of the vehicle behavior that can be stabilized by the VSA system 26 has occurred (step ST9). When the vehicle behavior is stable (ST9: No), the control device 11 determines whether there is a brake operation by the driver, namely, whether the detection value of the pedal stroke sensor 10a is greater than 0 (step ST10). When there is no brake operation by the driver (ST10: No), the control device 11 ends this routine.

On the other hand, when it is determined in step ST8 that automatic braking is necessary (Yes), when it is determined in step ST9 that the vehicle behavior is unstable (Yes), or when it is determined in step ST10 that there is a brake operation by the driver (Yes), the control device 11 activates the VSA system 26 (step ST11). Specifically, the control device 11 activates the hydraulic motor 26a to thereby supply a necessary fluid pressure to the disk brakes 7 so that a desired brake force is generated in each wheel 2. At this time, the both switching valves 24a, 24b are in the second state shown in FIG. 2, and therefore, the VSA system 26 is supplied with the hydraulic oil from the motor actuated cylinder 13 via the oil passages 16d. As described above, the orifices of the oil passages 16d connecting the motor actuated cylinder 13 to the switching valves 24a, 24b are larger than the orifices of the oil passages 16c connecting the master cylinder 15 to the switching valves 24a, 24b, and thus the flow resistance of hydraulic oil is smaller in the oil passages 16d than in the oil passages 16c. Therefore, the hydraulic oil is supplied to the VSA system 26 with a high flow rate, and the responsiveness of the disk brakes 7 is high.

In this way, when it is determined in steps ST1, ST2 that automatic brake control in which the fluid pressure is supplied to the disk brakes 7 regardless of the brake operation by the driver is executed (Yes), the control device 11 places the switching valves 24a, 24b in the second state in step ST7. When it is determined in step ST3 that a predetermined abnormality has occurred in the vehicle V (Yes), the control device 11 places the switching valves 24a, 24b in the first state in the step ST5. If during the execution of the automatic brake control (ST1: Yes, ST2: Yes) it is determined in step ST4 that an abnormality including inability of the motor actuated cylinder 13 to generate the fluid pressure has occurred in the vehicle V (Yes), the control device 11 places the switching valves 24a, 24b in the second state in step ST7. As a result, the motor actuated cylinder 13 and the VSA system 26 are brought into a communicating state, namely, a state functionally connected to each other via the oil passages 16d. Thereby, the VSA system 26 can receive supply of the hydraulic oil from the motor actuated cylinder 13. Therefore, it is possible to enhance the pressure boosting performance of the VSA system 26 when the hydraulic oil is at a low temperature, while making the oil passages 16 shorter and reducing the overall size of the brake system 1.

When it is determined in step ST4 that an abnormality including inability of the motor actuated cylinder 13 to generate the fluid pressure has occurred in the vehicle V during the execution of the automatic brake control (Yes), the VSA system 26 increases the fluid pressure of the hydraulic oil and applies the increased fluid pressure to the disk brakes 7 in step ST11. In this way, when the motor actuated cylinder 13 becomes unable to generate a fluid pressure during the execution of the automatic brake control, the VSA system 26 receives the hydraulic oil supplied from the motor actuated cylinder 13 and generates a brake force. Thereby, the pressure boosting performance of the VSA system 26 is improved.

Also, when it is determined in step ST4 that an abnormality including inability of the motor actuated cylinder 13 to generate the fluid pressure has occurred in the vehicle V during the execution of the automatic brake control (Yes) and it is determined in step ST10 that there is a brake operation by the driver (Yes), the VSA system 26 generates a fluid pressure according to the brake operating amount in the hydraulic oil in step ST11 while being supplied with the hydraulic oil from the motor actuated cylinder 13. Therefore, when the motor actuated cylinder 13 becomes unable to generate a fluid pressure during the execution of the automatic brake control, the VSA system 26 can generate a brake force according to the amount of brake operation by the driver. At this time also, the VSA system 26 generates a brake force while being supplied with the hydraulic oil from the motor actuated cylinder 13. Therefore, the pressure boosting performance of the VSA system 26 is improved when the hydraulic oil is at a low temperature.

Concrete embodiments of the present invention have been described in the foregoing, but the present invention is not limited to the above embodiment and may be modified or altered in various ways. For example, in the above embodiment, the present invention is applied to an electric or hybrid vehicle as one example, but the present invention may be applied to a vehicle V driven by only the engine E. Also, in the above embodiment, two hydraulic circuits respectively corresponding to the front wheels 2F and the rear wheels 2R are provided and accordingly the brake system 1 is provided with two switching valves 24a, 24b, but a single hydraulic circuit may be provided and accordingly the brake system 1 may be provided with only one switching valve 24a. In the above embodiment, the control device 11 performs a regenerative cooperative control which includes not only a hydraulic braking but also a regenerative braking, but the control device 11 may perform control including only the hydraulic braking without performing the regenerative braking. Further, the concrete structure, arrangement, number, numerical value, etc. of each member or part mode as well as the concrete control described in the above embodiment may be appropriately changed without departing from the scope of the present invention. Also, not all of the components of the brake system 1 shown in the above embodiment are necessarily indispensable and they may be selectively adopted as appropriate.

The invention claimed is:

1. A vehicle brake system, comprising:
a first fluid pressure generating device configured to generate a fluid pressure according to a brake operating amount, which is an amount of operation of a brake operation member by a driver;
a second fluid pressure generating device configured to generate a fluid pressure by moving a piston with an electric actuator;
a frictional brake provided for each wheel and actuated by the fluid pressure;
a switching valve configured to switch oil passages such that the frictional brake is functionally connected to one of the first fluid pressure generating device and the second fluid pressure generating device;
a control device configured to control the second fluid pressure generating device and the switching valve; and
a vehicle behavior stabilizing device provided in the oil passage between the switching valve and the frictional brake, the vehicle behavior stabilizing device being configured to adjust the fluid pressure of a hydraulic fluid supplied from the first fluid pressure generating device or the second fluid pressure generating device and to apply an adjusted fluid pressure to the frictional brake,
wherein the switching valve is configured to be switchable between a first state in which the switching valve makes the first fluid pressure generating device and the vehicle behavior stabilizing device communicate with each other and prevents a flow of the hydraulic fluid from the vehicle behavior stabilizing device to the second fluid pressure generating device and a second state in which the switching valve prevents a flow of the hydraulic fluid from the vehicle behavior stabilizing device to the first fluid pressure generating device and makes the second fluid pressure generating device and the vehicle behavior stabilizing device communicate with each other, and
the control device places the switching valve in the second state during execution of automatic brake control in which the fluid pressure is supplied to the frictional brake regardless of brake operation by the driver, and places the switching valve in the first state when a predetermined abnormality occurs in the vehicle, except that the control device places the switching valve in the second state when an abnormality including inability of the second fluid pressure generating device to generate the fluid pressure occurs in the vehicle during the execution of the automatic brake control.

2. The vehicle brake system according to claim 1, wherein when the abnormality including inability of the second fluid pressure generating device to generate the fluid pressure occurs in the vehicle during the execution of the automatic brake control, the vehicle behavior stabilizing device increases the fluid pressure of the hydraulic fluid and applies an increased fluid pressure to the frictional brake during the execution of the automatic brake control.

3. The vehicle brake system according to claim 2, wherein when the abnormality including inability of the second fluid pressure generating device to generate the fluid pressure occurs in the vehicle during the execution of the automatic brake control, and there is a brake operation by the driver, the vehicle behavior stabilizing device generates the fluid pressure according to the brake operating amount in the hydraulic fluid while supplied with the hydraulic fluid from the second fluid pressure generating device.

* * * * *